US009796342B2

(12) United States Patent
Cha et al.

(10) Patent No.: US 9,796,342 B2
(45) Date of Patent: Oct. 24, 2017

(54) BICYCLE CARRIER SYSTEM FOR VEHICLE

(71) Applicant: Hyundai Motor Company, Seoul (KR)

(72) Inventors: Dong Eun Cha, Suwon-si (KR); Jin Young Yoon, Gimpo-si (KR); Seung Mok Lee, Osan-si (KR); Hyun Gyung Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 245 days.

(21) Appl. No.: 14/561,013

(22) Filed: Dec. 4, 2014

(65) Prior Publication Data

US 2016/0096482 A1 Apr. 7, 2016

(30) Foreign Application Priority Data

Oct. 6, 2014 (KR) .................. 10-2014-0134003

(51) Int. Cl.
*B60R 9/10* (2006.01)
*B60R 9/06* (2006.01)
(52) U.S. Cl.
CPC . *B60R 9/10* (2013.01); *B60R 9/06* (2013.01)
(58) Field of Classification Search
CPC ............................. B60R 9/10; Y10S 224/924
USPC ........................................................ 224/924
See application file for complete search history.

(56) References Cited

U.S. PATENT DOCUMENTS

| 4,272,218 A * | 6/1981 | Carter ................... B60R 9/0426 224/310 |
| 4,685,860 A * | 8/1987 | McFarland .......... A61G 3/0209 212/280 |
| 5,456,564 A * | 10/1995 | Bianchini ................. B60R 9/06 224/508 |
| 6,109,395 A * | 8/2000 | Storm ................... B66B 9/0869 187/200 |
| 6,701,913 B1 * | 3/2004 | LeDuc ...................... B60R 9/06 126/276 |
| 6,900,603 B1 * | 5/2005 | Del Vecchio .......... G08C 17/02 318/16 |
| 7,909,213 B2 * | 3/2011 | Bergerhoff ............... B60R 9/10 224/197 |

(Continued)

FOREIGN PATENT DOCUMENTS

| KR | 10-1999-0050624 A | 7/1999 |
| KR | 10-2011-0010877 A | 2/2011 |

(Continued)

*Primary Examiner* — Nathan J Newhouse
*Assistant Examiner* — Phillip Schmidt
(74) *Attorney, Agent, or Firm* — Morgan, Lewis & Bockius LLP (57) ABSTRACT

A bicycle carrier system for a vehicle may include guide rails disposed at a lower portion of a bumper back beam, a carrier part provided with a panel part and side portions extending from both sides of the panel part to the guide rails to move along the guide rails, a first driving part connected to the guide rails to move the carrier part along the guide rails, an expansion support part installed between the side portions of the carrier part to support a loaded bicycle, a second driving part installed at the carrier part to be connected to the expansion support part and expandably deploy the expansion support part, and a control unit controlling the first and second driving parts and sequentially controlling the first and second driving parts to draw out the carrier part and then performing an expansion deployment operation of the expansion support part.

19 Claims, 11 Drawing Sheets

(56) References Cited

U.S. PATENT DOCUMENTS

| | | | | |
|---|---|---|---|---|
| 8,113,760 B1* | 2/2012 | Schroll | ................... | A61G 3/06 |
| | | | | 414/522 |
| 2001/0001636 A1* | 5/2001 | Klinkenberg | ......... | B60P 1/4414 |
| | | | | 414/462 |
| 2002/0110445 A1* | 8/2002 | Odegaard | ............... | B60P 3/122 |
| | | | | 414/563 |
| 2008/0142559 A1* | 6/2008 | Lim | ......................... | B60R 9/10 |
| | | | | 224/489 |
| 2010/0089957 A1* | 4/2010 | Barth | ....................... | B60R 9/10 |
| | | | | 224/497 |
| 2010/0320715 A1* | 12/2010 | Watson | ................... | B60R 3/002 |
| | | | | 280/166 |
| 2014/0064893 A1* | 3/2014 | Thibault | ............... | B60R 9/0423 |
| | | | | 414/462 |

FOREIGN PATENT DOCUMENTS

| KR | 10-2011-0034733 A | 4/2011 |
|---|---|---|
| KR | 10-2011-0035378 A | 4/2011 |
| KR | 10-2011-0050162 A | 5/2011 |
| KR | 10-1154526 B1 | 6/2012 |

* cited by examiner

BICYCLE CARRIER SYSTEM FOR VEHICLE

CROSS REFERENCE TO RELATED APPLICATION

The present application claims priority to Korean Patent Application No. 10-2014-0134003 filed on Oct. 6, 2014, the entire contents of which application are incorporated herein for all purposes by this reference.

BACKGROUND OF THE INVENTION

Field of the Invention

The present invention relates to a bicycle carrier system for a vehicle in which the carrier is configured to be received in a bumper back beam at ordinary times, drawn out to the outside when a bicycle is loaded, and tilted in the drawn out state, in the carrier which is installed in a rear bumper of a vehicle to load a bicycle and luggage.

Description of Related Art

Recently, as a bicycle is used as a leisure means, the bicycle is loaded in a vehicle to move the bicycle to a bicycle lane or near the mountains.

However, the bicycle generally has a large volume and therefore even though a trunk or a back seat room of the vehicle is used, it is difficult to load the bicycle.

To solve the above problem, various methods for loading a bicycle outside the vehicle have been proposed, but in the case of a method of fixing and loading a bicycle in a roof panel of the vehicle, a loading work itself is very inconvenient and a height of the vehicle is increased, such that the bicycle is locked when entering a tunnel or a building, thereby causing safety accidents.

A method of loading a bicycle in a back portion of a tail gate of the vehicle may cause an inconvenience to install a separate carrier apparatus in the tail gate and ruin an appearance design due to the exposure of the carrier apparatus to the outside even at ordinary times when the bicycle is not loaded.

Further, since when the bicycle needs to be loaded, the carrier apparatus is installed and when the bicycle need not be loaded, an inconvenience to again separate the bicycle occurs, convenience results in insufficiency.

The matters described as the related art have been provided only for assisting in the understanding for the background of the present invention and should not be considered as corresponding to the related art known to those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a bicycle carrier system for a vehicle capable of maintaining an appearance design at ordinary times and improving convenience, by installing a bicycle carrier at a bumper back beam of a rear portion of the vehicle to prevent the bicycle carrier from being exposed to the outside at ordinary times and drawing out the bicycle carrier from the bumper back beam when the loading of the bicycle is required to enable a loading of the bicycle.

In an aspect of the present invention, a bicycle carrier system for a vehicle, may include guide rails disposed at a lower portion of a bumper back beam while being symmetrical to each other in front and rear directions, a carrier part provided with a panel part and provided with side portions extending from both sides of the panel part to the guide rails to move along the guide rails to be drawn out and received, a first driving part installed at a front end portion of the carrier part and connected to the guide rails to move the carrier part in the front and rear directions along the guide rails, an expansion support part installed between the side portions of the carrier part to be expandably deployed laterally and support a loaded bicycle, a second driving part installed at the carrier part to be connected to the expansion support part and expandably deploy the expansion support part, and a control unit controlling an operation of the first driving part and the second driving part and sequentially controlling the first driving part and the second driving part to draw out the carrier part and then performing an expansion deployment operation of the expansion support part.

The bumper back beam is provided with a rear sensing sensor which senses objects within a predetermined distance from a rear and the control unit stops operations of the first driving part and the second driving part when object sensing information is received through the rear sensing sensor.

The control unit transfers a warning message to a driver when the object sensing information is received through the rear sensing sensor.

The control unit stores a first reference time required to move the carrier part to a maximally drawn out position by operating the first driving part and when an operating time of the first driving part is equal to or more than the first reference time, operates the second driving part.

The control unit stores a second reference time required to deploy the expansion support part to a maximally expanded position by operating the second driving part and when an operating time of the second driving part is equal to or more than the second reference time, stops the operation of the second driving part.

The control unit stores a first reference setting value for an operating load of the first driving part and when the operating load of the first driving part is larger than the first reference setting value at a time of a drawing out operation of the carrier part, stops the operation of the first driving part.

The control unit stores a second reference setting value for an operating load of the second driving part and when the operating load of the second driving part is larger than the second reference setting value at a time of an expansion deployment of the expansion support part, stops the operation of the second driving part.

The first driving part may include a first motor part transferring rotation power at a time of a signal input of the control unit, and a moving link part extending from the first motor part toward the side portions, making extending ends be connected to the guide rails, and making the carrier part slidably move in the front and rear directions along the guide rails when the first motor part is operated.

The extending ends of the moving link part are provided with pinion gears and the guide rails are provided with rack gears extending in the front and rear directions to be meshed with the pinion gears.

The expansion support part may include an expansion rail extending to cross the side portions of the carrier part to be fixed to the side portions, a loading part slidably moving along the expansion rail, and an expansion link part extending in parallel with the expansion rail, being connected to the loading part to be move along a direction in which the loading part extends, and being connected to the second driving part to move the loading part along the expansion rail at a time of the operation of the second driving part.

The loading part may include a moving member connected to the expansion link part to move along the direction in which the expansion link part extends at a time of the operation of the second driving part, and a support member extending laterally from the moving member to support a wheel of the bicycle.

The expansion link part is configured as a lead screw and is screw-connected to one side end of the moving member by penetrating through the moving member.

The expansion rail is provided with a guide groove along an extending direction and the support member is provided with a sliding part inserted into the guide groove to slidably move along the guide groove.

The second driving part may include a second motor part transferring rotation power at a time of a signal input of the control unit, and a rotation part extending laterally from the second motor part to be connected to the expansion link part and rotating in the front and rear directions at a time of an operation of the second motor part to transfer the rotation power to the expansion link part.

The expansion link part is provided with a rotation connection part connected to the rotation part to receive the rotation power of the second motor part.

The rotation part of the second driving part and the rotation connection part of the expansion link part are provided with a gear mutually meshed with an outer circumferential surface.

The guide rails are provided with first solenoid parts selectively connected to the side portions of the carrier part to selectively permit a sliding movement of the carrier part.

The guide rail is provided with a fixing bracket fixedly installed to a rear end portion thereof and a tilting bracket positioned at a rear portion of the fixing bracket to be rotatably installed at the bumper back beam.

The fixing bracket is provided with a second solenoid part selectively connected to the tilting bracket to selectively permit a rotation operation of the tilting bracket.

The side portion of the carrier part is rotatably provided with a fixing bar and is provided with a fixing member configured to fix a rotation position of the fixing bar.

Other detailed matters of the present invention are included in the detailed description and the accompanying drawings.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a bicycle carrier system for a vehicle according to exemplary embodiments of the present invention will be described with reference to the accompanying drawings.

Figure 1:
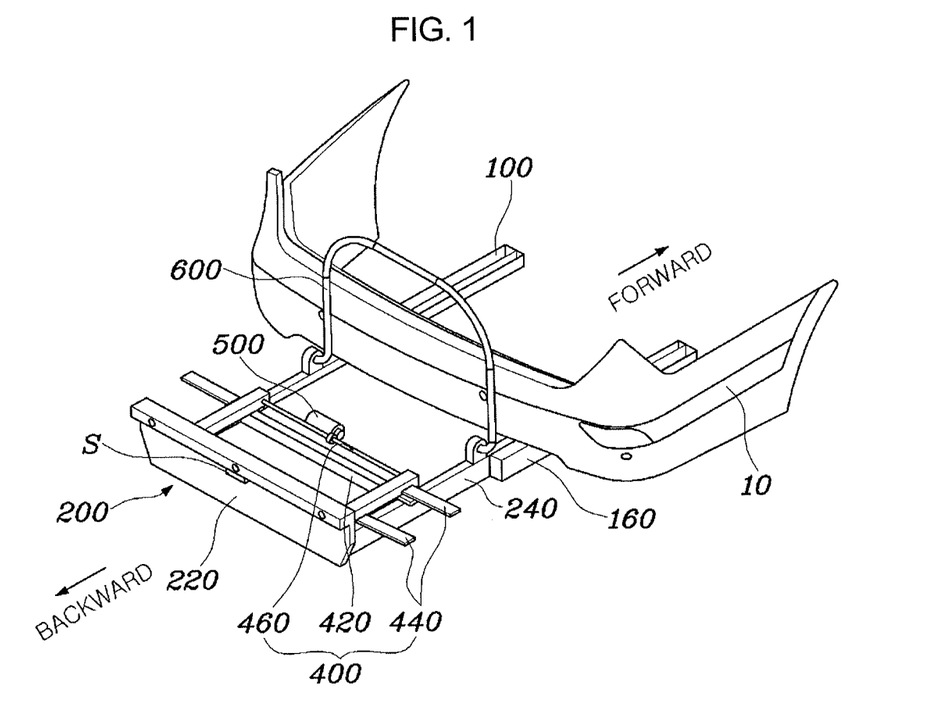
FIG. 1 is a perspective view of a bicycle carrier system for a vehicle according to an exemplary embodiment of the present invention.
Figure 2:
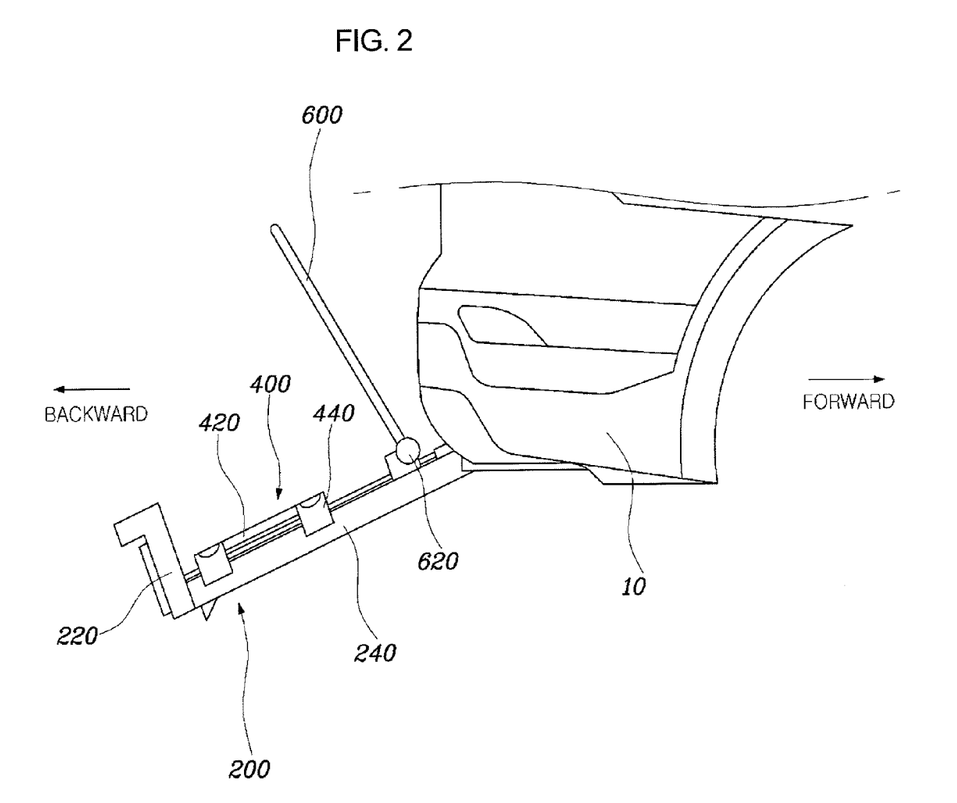
FIG. 2 is a diagram illustrating a tilting operation of the bicycle carrier system for a vehicle illustrated in FIG. 1.

FIG. 1 is a perspective view of a bicycle carrier for a vehicle according to an exemplary embodiment of the present invention, FIG. 2 is a diagram illustrating a tilting operation of the bicycle carrier for a vehicle illustrated in FIG. 1, and FIG. 3, FIG. 4, FIG. 5, FIG. 6, FIG. 7, FIG. 8 and FIG. 9 are diagrams for describing the bicycle carrier for a vehicle illustrated in FIG. 1.

Figure 10:
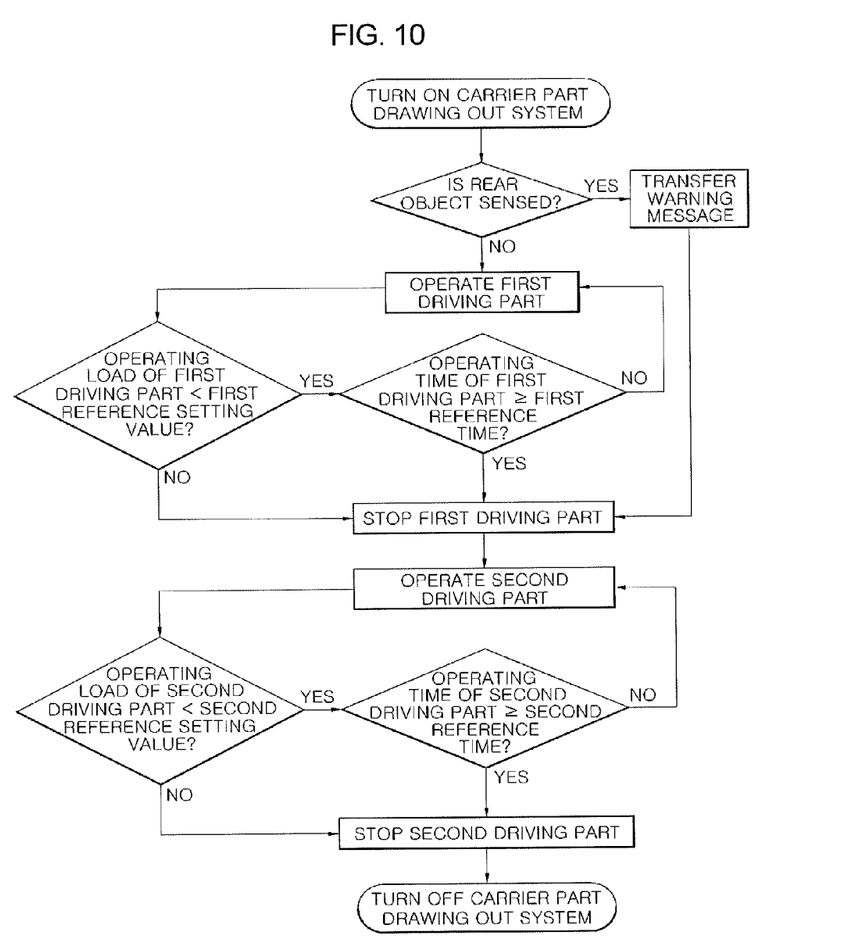
FIG. 10 is a flow chart illustrating a method for controlling drawing out of a bicycle carrier system for a vehicle according to an exemplary embodiment of the present invention.
Figure 11:
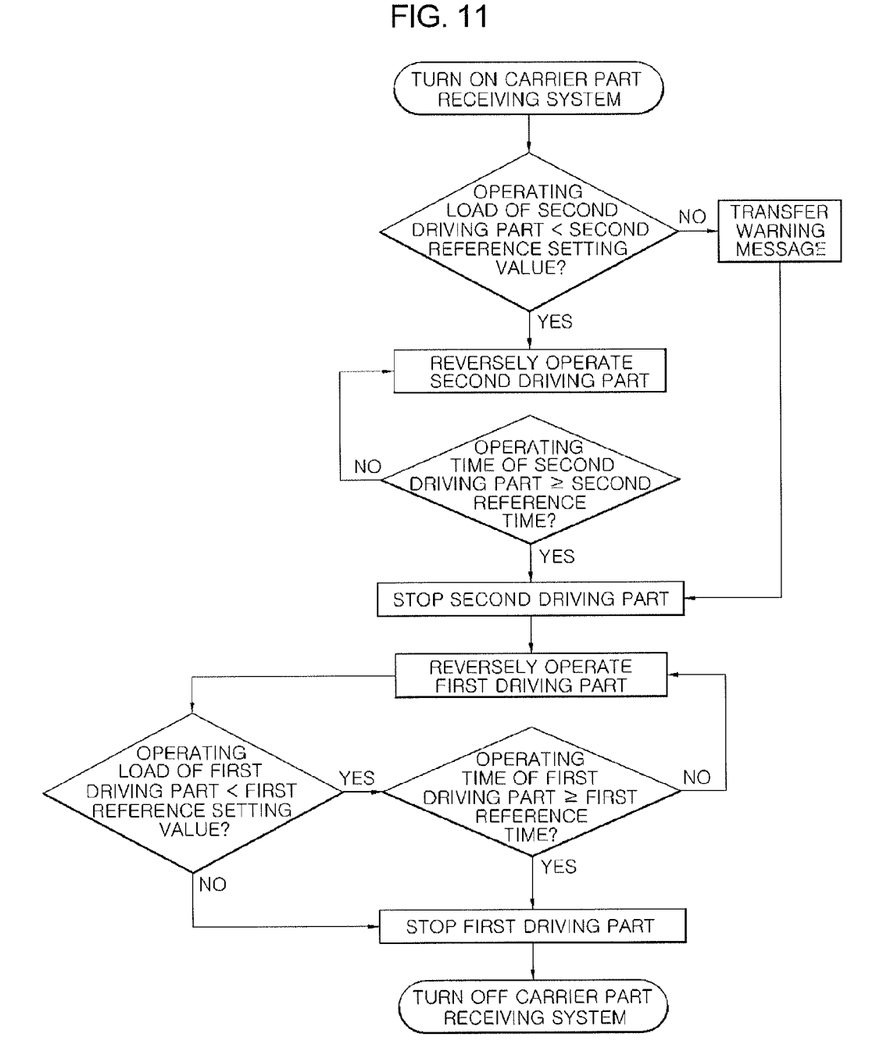
FIG. 11 is a flow chart illustrating a method for controlling receiving of a bicycle carrier system for a vehicle according to an exemplary embodiment of the present invention.

FIG. 10 is a flow chart illustrating a method for controlling drawing out of a bicycle carrier system for a vehicle according to an exemplary embodiment of the present invention and FIG. 11 is a flow chart illustrating a method for controlling receiving of a bicycle carrier system for a vehicle according to an exemplary embodiment of the present invention.

A bicycle carrier for a vehicle according to the exemplary embodiment of the present invention includes guide rails 100 configured to be disposed at a lower portion of a bumper back beam 10 while being symmetrical to each other and extendedly formed in a front and rear direction, a carrier part 200 configured to be provided with a panel part 220 and provided with side portions 240 extending from both sides of the panel part 220 to the guide rails 100 to slidably move in a front and rear direction along the guide rails 100, a first driving part 300 configured to be installed at a front end portion of the carrier part 200 and connected to the guide rails 100 to move the carrier part 200 in a front and rear direction along the guide rail 100, an expansion support part 400 configured to be installed between the side portions 240 of the carrier part 200 to be expandably deployed laterally and support a loaded bicycle, a second driving part 500 configured to be installed at the carrier part 200 to be connected to the expansion support part 400 and expandably deploy bilaterally the expansion support part 400, and a control unit B configured to control an operation of the first driving part 300 and the second driving part 500 and sequentially control the first driving part 300 and the second driving part 500 to draw out the carrier part 200 and then perform an expansion deployment operation of the expansion support part 400.

The bicycle carrier according to the exemplary embodiment of the present invention may be installed at the bumper back beam 10 of the rear portion of the vehicle and may be configured to be drawn out or received from or in the bumper back beam 10 or to be drawn out or received from or in the lower portion of the bumper back beam 10. Further, the expansion support part 400 which is expandably deployed laterally after the carrier part 200 is drawn out so as to load the bicycle is provided and the carrier part 200 is configured to be tilted, such that the bicycle carrier may be easily used.

Figure 3:
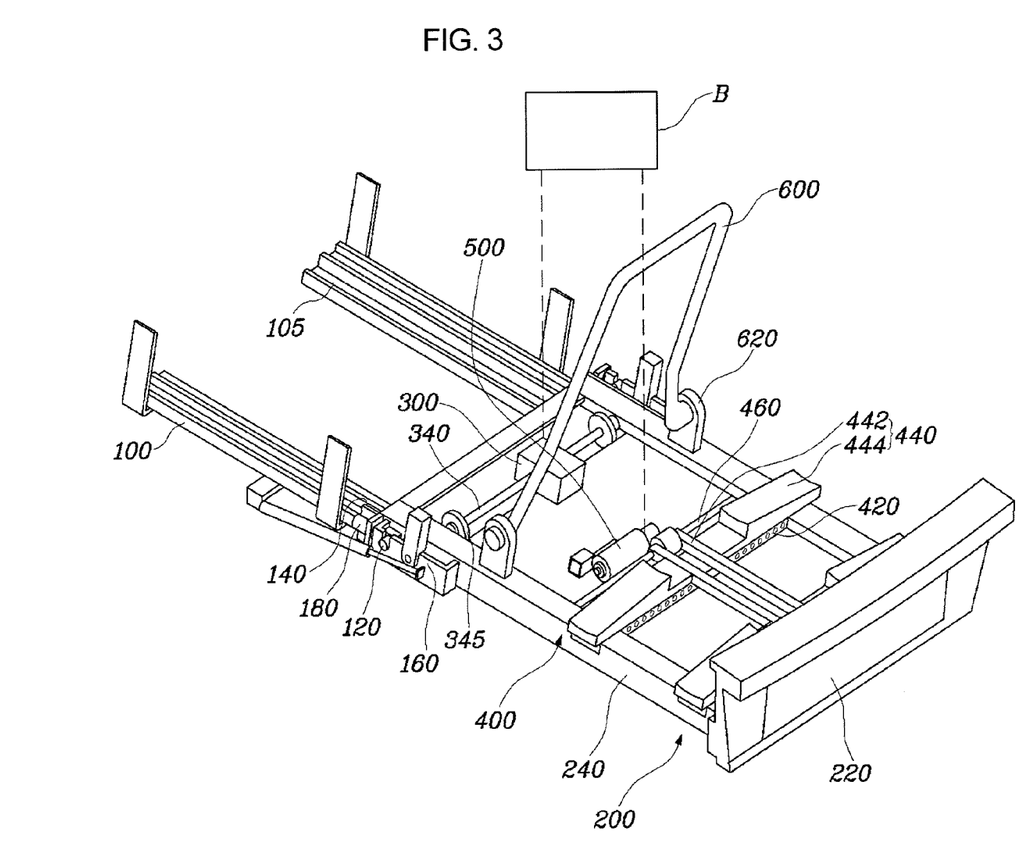
FIG. 3, FIG. 4, FIG. 5, FIG. 6, FIG. 7, FIG. 8 and FIG. 9 are diagrams for describing the bicycle carrier system for a vehicle illustrated in FIG. 1.
Figure 4:
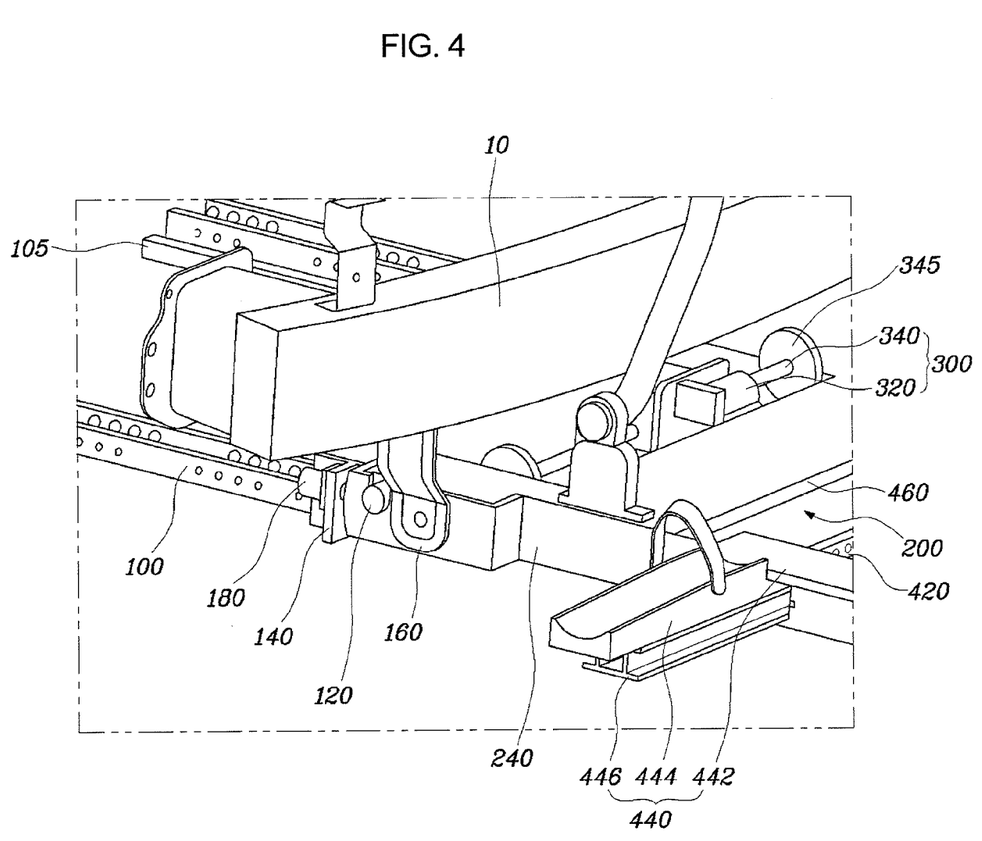

According to the exemplary embodiment of the present invention, as illustrated in FIGS. 3 and 4, the guide rails 100 are fixedly provided at both sides of the lower portion of the bumper back beam 100 while being symmetrical to each other and are extendedly formed in the front and rear direction. That is, the carrier part 200 slidably moves along the guide rails 100 to be drawn out to the outside of the bumper back beam 10 or received in the bumper back beam 10.

Meanwhile, the carrier part 200 is provided with the panel part 220 forming the same surface as the bumper back beam 10 and the side portions 240 extending forward from the both side ends of the panel part 220 are connected to the guide rails 100. That is, the side portions 240 of the carrier part 200 move along the guide rails to perform the drawing out or receiving operation of the carrier part 200.

The carrier part 200 is provided with the first driving part 300 to move the carrier part 200 on the guide rail 100 and when the drawing out of the carrier part 200 is completed, the bicycle may be loaded by expandably deploying the expansion support part 400.

Here, the first driving part 300 and the second driving part 500 are operated by the control of the control unit B. That is, the control unit B sequentially controls the first driving part 300 and the second driving part 500 when the bicycle needs to be loaded to perform the smooth drawing out and expansion operation, thereby performing the stable driving.

In detail, the bumper back beam 10 is provided with a rear sensing sensor S which senses objects within a predetermined distance from a rear and the control unit B may stop the operations of the first driving part 300 and the second driving part 500 when object sensing information is received through the rear sensing sensor S.

Here, as the rear sensing sensor S, a rear parking assist system (RPAS) using ultrasonic characteristics may be applied, and when objects within a predetermined distance are sensed, the rear sensing sensor S may transfer the sensing signal to the control unit B. By doing so, since the carrier part 200 collides with obstacles at the time of the drawing out and expansion operation of the carrier part 200 and thus the carrier part 200 may be damaged and when a person is positioned, he/she collides with the carrier part 200 and thus may be damaged, when the sensing signal is input to the control unit B, the operations of the first driving part 300 and the second driving part 500 stop so as not to perform the drawing out and expansion operation of the carrier part 200.

More preferably, the control unit B may transfer a warning message to a driver when the object sensing information is received through the rear sensing sensor S. Here, the warning message may be transferred through a cluster and a warning sound may be generated to enable a driver to recognize that objects are present at the rear.

Meanwhile, the control unit B stores a first reference time required to move the carrier part 200 to a maximally drawn out position by operating the first driving part 300 and when the operating time of the first driving part 300 is equal to or more than the first reference time, may operate the second driving part 500.

Here, the first reference time pre-stored in the control unit B is a time required to move the carrier part 200 from an initial position to the maximally drawn out position and is a time required until the carrier part 200 is completely drawn out from the bumper back beam 10 when the first driving part 300 is driven at constant power.

The first reference time may also be set to be the time required to completely draw out the carrier part 200 and the time required to make the carrier part 200 be received in the bumper back beam 10 in the state in which the carrier part 200 is completely drawn out.

That is, when the carrier part 200 is drawn out, the control unit B recognizes the case in which the operating time of the first driving part 300 is equal to or more than the first reference time as the state in which the carrier part 200 is completely drawn out, thereby performing the operation of the second driving part 300. In the state in which the carrier 200 is not completely drawn out, when the second driving part 500 is operated and thus the expansion deployment of the expansion support part 400 is performed, a collision occurs inside the bumper back beam 10, such that the drawing out of the carrier part 200 may not be performed and the damage of the carrier part 200 may occur.

Therefore, the operation of the second driving part 500 is restricted before the operating time of the first driving part 300 reaches the first reference time pre-stored in the control unit B to prevent the occurrence of the problem and when the operating time of the first driving part 300 reaches the first reference time, the second driving part 500 is operated to smoothly perform the drawing out and expansion operation.

Meanwhile, the control unit B stores a second reference time required to deploy the expansion support part 400 to a maximally expanded position by operating the second driving part 300 and when the operating time of the second driving part 500 is equal to or more than the second reference time, may stop the operation of the second driving part 500.

Here, the second reference time pre-stored in the control unit B is a time required to move the expansion support part 400 from an initial position to the maximally deployed position and is a time required until the expansion support part 400 is completely expandably deployed when the second driving part 500 is driven at constant power.

The second reference time may be set to be a time required to completely draw out the expansion support part 400 and a time returning the expansion support part 400 from the state in which the expansion support part 400 is completely deployed to an initial position.

By doing so, in the state in which the first driving part 300 is operated and thus the carrier part 200 is completely drawn out, the expansion support part 400 is sufficiently deployed when the second driving part 500 is operated and the operating time of the second driving part 500 reaches the second reference time, and therefore the controller B stops the operation of the second driving part 500 to perform the loading of the bicycle.

Meanwhile, the control unit B stores a first reference setting value for an operating load of the first driving part 300 and when the load of the first driving part 300 is larger than the first reference setting value at the time of the drawing out operation of the carrier part 200, may stop the operation of the first driving part 300.

Here, the first reference setting value may be set to be a maximum load value of the first driving part 300 and may be a fail safe as a reference value to prevent the excessive operation of the first driving part 300. That is, in the case in which the load depending on the operation of the first driving part 300 reaches the first reference setting value, the first driving part 300 is applied with an additional load in addition to a load for drawing out and receiving the carrier part 200. When the state is continued, a failure may occur due to an overload of the first driving part 300.

As a method for determining a load state of the first driving part 300, a method for measuring a temperature of a motor or a method for measuring a current value applied to a motor may be applied. For example, the first reference setting value may be a reference temperature value at the time of using the temperature of the motor as the load state of the first driving part 300 and the first reference setting value may be a reference current value at the time of using the current value applied to the motor.

By doing so, the operating load of the first driving part 300 is compared and determined with the first reference setting value and when the operating load of the first driving part 300 is larger than the first reference setting value, the operation of the first driving part stops to prevent the excessive operation of the first driving part.

Further, the control unit B stores a second reference setting value for an operating load of the second driving part 500 and when the load of the second driving part 500 is larger than the second reference setting value at the time of the expansion deployment of the expansion support part 400, may stop the operation of the second driving part 500.

Here, the second reference setting value may be set to be a maximum load value of the second driving part 500 and may be a fail safe as a reference value to prevent the excessive operation of the second driving part 500.

This is to prevent an object from being locked at the time of the expansion deployment operation of the expansion support part 400 or the second driving part 500 from overloading due to a mechanical error.

Describing in detail the structure of the present invention, the first driving part 300 may include: a first motor part 320 configured to transfer rotation power at the time of the signal input of the control unit B, and a moving link part 340 configured to extend from the first motor part 320 toward the side portions 240, make the extending ends be connected to the guide rails 100, and make the carrier part 200 slidably move in a front and rear direction along the guide rail 100 when the first motor part 320 is operated.

In this configuration, the extending ends of the moving link part 340 may be provided with pinion gears 345 and the guide rails 100 may be provided with rack gears 105 extending in a front and rear direction to be meshed with the pinion gears 345.

That is, the moving link part 340 extends from the first motor part 320 to both side parts 240 of the carrier part 200 to be rotatably installed when the first motor part 320 is operated. The extending ends of the moving link part 340 are provided with the pinion gears 345 meshed with the rack gears 105 formed at the guide rails, such that as the moving link part 340 rotates when the first motor part 320 is operated, the pinion gears 345 rotate and thus moves over the rack gears 105.

In addition to this, the guide rails 100 may be provided with first solenoid parts 120 configured to be selectively connected to the side portions 240 of the carrier part 200 to selectively permit the sliding movement of the carrier part 200. The first solenoid part 120 may be operated by interlocking with the first motor part 320 and when electricity is applied to the first solenoid part 120 at the time of the drawing out or receiving operation of the carrier part 200, the first solenoid part 120 is separated from the side portions 240 to permit the movement of the carrier part 200. To this end, the side portions 240 of the carrier part 200 may be provided with fixing grooves into which the first solenoid parts 120 may be inserted and the fixing groove may be positioned at a front end portion and a rear end portion of the side portion 240 so that the received state and the drawn out state of the carrier part 200 may be fixed.

Meanwhile, the carrier part 200 is provided with the expansion support part 400 configured to support a bicycle and the second driving part 500 configured so that the expansion support part 400 is deployed.

Figure 5:
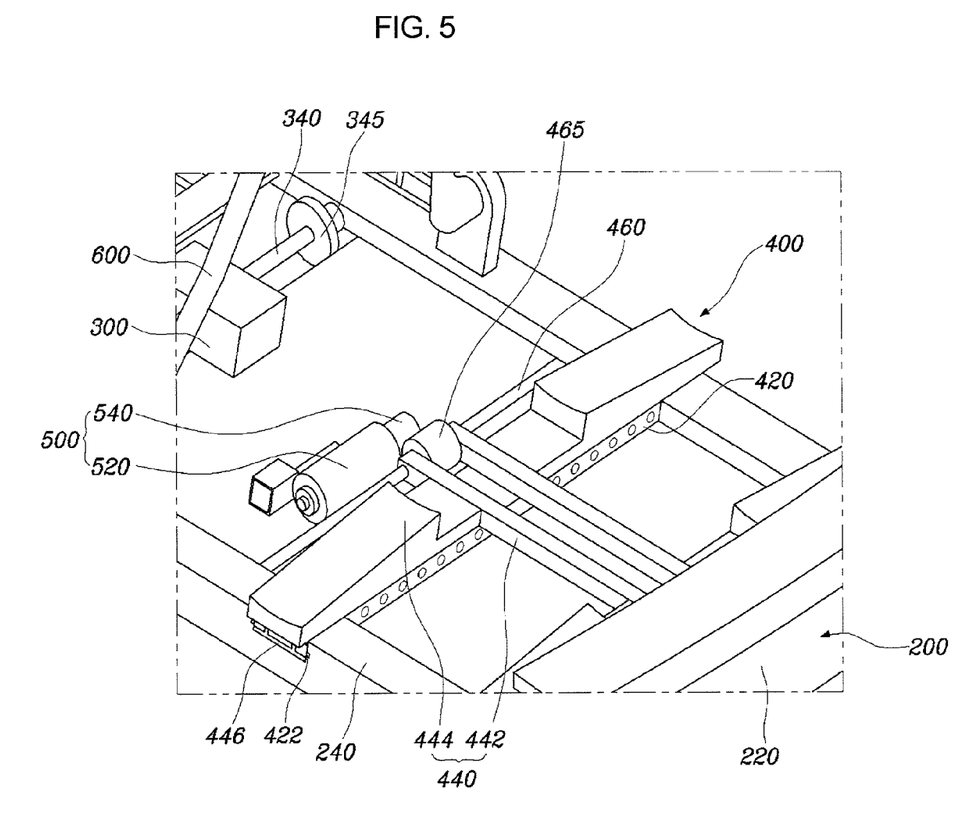
Figure 6:
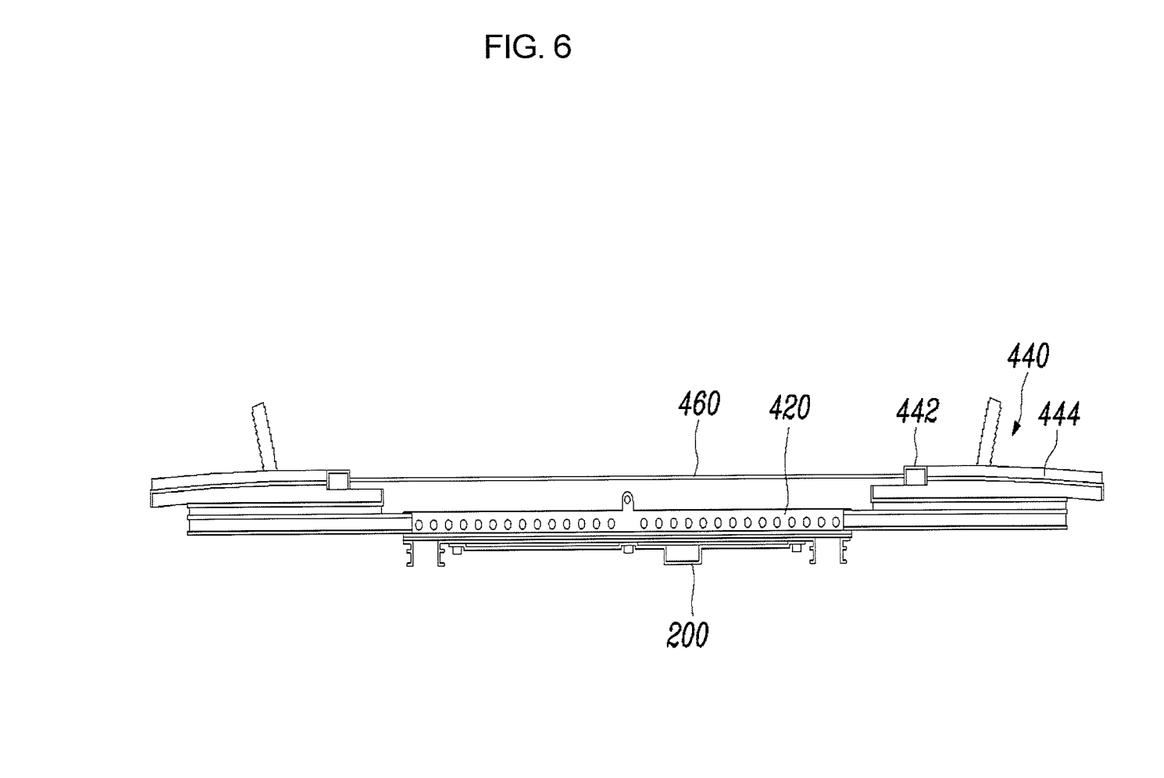
Figure 7:
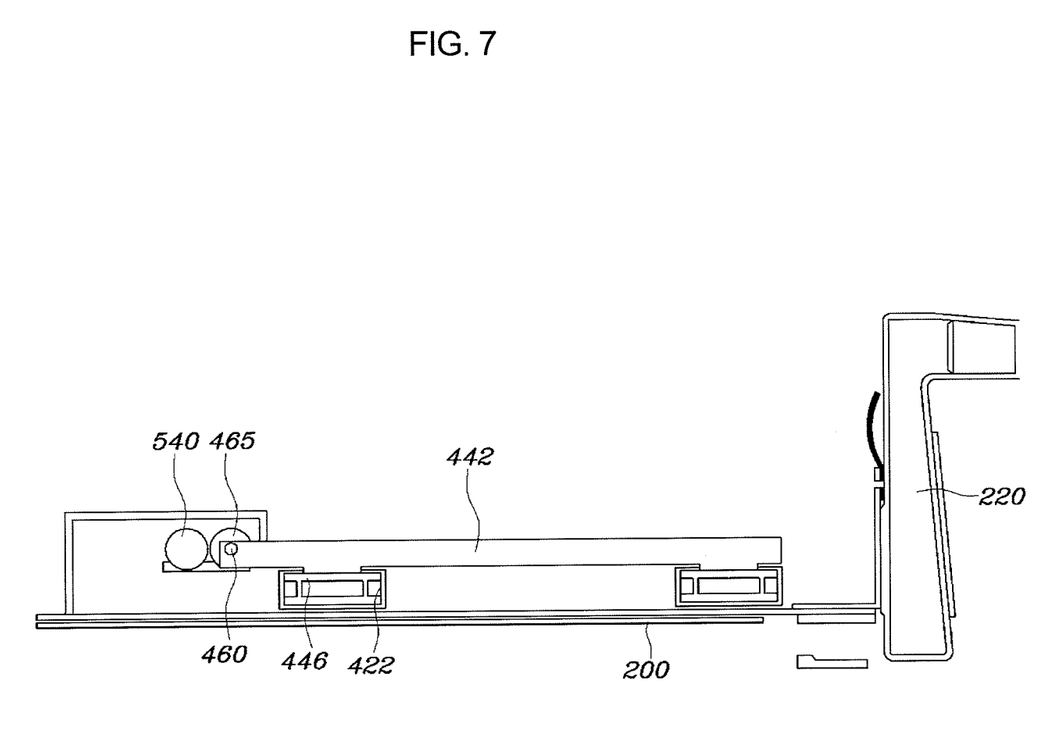

In detail, as illustrated in FIGS. 5 to 7, the expansion support part 400 may include: an expansion rail 420 configured to extend to cross the side portions 240 of the carrier part 200 so as to be fixed to the side portions 240, a loading part 440 configured to slidably move along the expansion rail 420, and an expansion link part 460 configured to extend in parallel with the expansion rail 420, be connected to the loading part to move along a direction in which the loading part 440 extends, and be connected to the second driving part 500 to move the loading part 440 along the expansion rail 420 at the time of the operation of the second driving part 500.

That is, the expansion rail 420 of the expansion support part 400 is fixed crossing both side portions 240 of the carrier part 200. The expansion rail 420 guides the loading part 440 to move laterally and is configured to secure sufficient rigidity, and thus may support a load of a bicycle even though the bicycle is loaded at the loading part 440.

Meanwhile, the loading part 440 may be configured in a pair so as to be symmetrical to both sides on a central line in the front and rear direction of the carrier part 200. By doing so, the loading part 440 is configured in a pair so as to be loaded bilaterally, such that the loading part 440 may be set to be fitted in a width of the bicycle.

The loading part 440 may include a moving member 442 configured to be connected to the expansion link part 460 to move along the direction in which the expansion link part 460 extends at the time of the operation of the second driving part 500 and a support member 444 configured to extend laterally from the moving member 442 to support a wheel of the bicycle.

Describing the movement of the loading part 440, the expansion link part 460 is configured as a lead screw and may be screw-connected to one side end of the moving member 442 by penetrating through the moving member 442. That is, the expansion link part 460 is configured as the lead screw and the one side end of the moving member 442 is configured as a lead nut into which a lead screw is inserted so as to be screw-connected to each other, such that when the expansion link part 460 rotates, the moving member 442 moves laterally over a thread of the expansion link part 460 configured as the lead screw.

However, according to the exemplary embodiment of the present invention, since the loading part 440 may be configured in a pair to be symmetrical to each other, the expansion link part 460 configured as the lead screw may perform an operation of making the pair of loading parts 440 approach to or far away from each other even though the expansion link part 460 rotates in one direction by making directions of both threads be opposite to each other based on a center in a length direction.

The support member 444 is a portion to which the wheel of the bicycle is touched and an upper end surface thereof is formed to be bent to prevent the wheel of the bicycle from separating and may firmly fix the wheel of the bicycle to the support member 440 by a separate fixing member.

Meanwhile, as illustrated in FIG. 7, the expansion rail 420 is provided with a guide groove 422 along the extending direction and the support member 444 may be provided with a sliding part 446 configured to be inserted into the guide groove 422 to slidably move along the guide groove 422. By doing so, the guide groove 422 formed in the expansion rail 420 is configured to have the sliding part 446 formed in the support member 444 inserted thereinto, such that the support member 444 may be prevented from separating from the expansion rail 420 and the smooth sliding moving operation may be performed.

As such, the expansion support part 400 is expandably deployed to the side of the carrier part 200 by the second driving part 500 to load the bicycle.

For this purpose, the second driving part 500 may include a second motor part 520 configured to transfer rotation power at the time of the signal input of the control unit B and a rotation part 540 configured to extend laterally from the second motor part 520 to be connected to the expansion link part 460 and rotate in a front and rear direction at the time of the operation of the second motor part 520 to transfer the rotation power to the expansion link part 460.

In this configuration, the second motor part 520 may be adjacently installed to the expansion link part 460 and the second motor part 520 is provided with the rotation part 540 rotating in the front and rear direction at the time of the transfer of power. The rotating part 540 is connected to the expansion link part 460 to move the loading part 440 depending on the rotation of the expansion link part 460 when the second motor part 520 is operated.

The expansion link part 460 may be provided with a rotation connection part 465 connected to the rotation part 540 to receive the rotation power of the second motor part 520. For example, the rotation part 540 of the second driving part 500 and the rotation connection part 465 of the expansion link part 460 are provided with a gear mutually meshed with an outer circumferential surface to smoothly transfer the rotation power of the second motor part 520 to the expansion link part 460 and perform the rotation of the expansion link part 460 as much as the controlled RPM of the second motor part 520.

According to the exemplary embodiment of the present invention, the carrier part 200 is drawn out or received from or in the bumper back beam 10 and the carrier part 200 may be configured to be drawn out and then be tilted at a predetermined angle.

Figure 8:
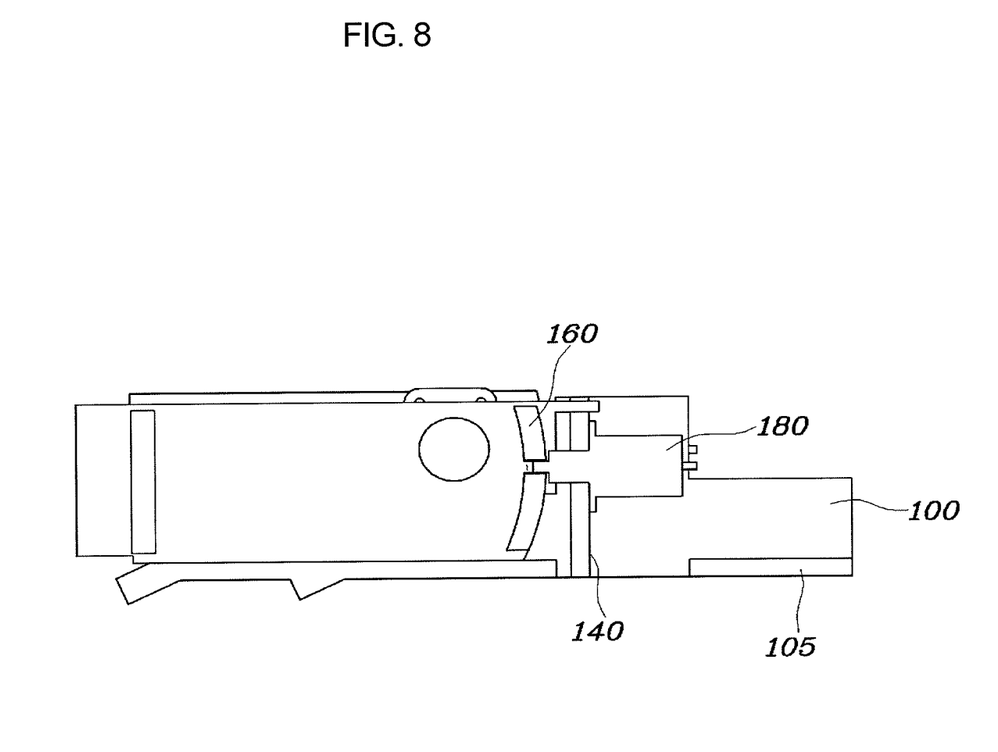

For this purpose, as illustrated in FIG. 8, the guide rail 100 is provided with a fixing bracket 140 configured to be fixedly installed to a rear end portion thereof and a tilting bracket 160 configured to be positioned at a rear portion of the fixing bracket 140 so as to be rotatably installed at the bumper back beam 10, such that the carrier part 200 performs the tilting operation along with the tilting bracket 160 by the rotation of the tilting bracket 160 in the state in which the carrier part 200 is completely drawn out.

In addition, the fixing bracket 140 is provided with a second solenoid part 180 configured to be selectively connected to the tilting bracket 160 to selectively permit the rotation operation of the tilting bracket 160. The second solenoid part 180 may be controlled by the control unit B and is connected to the tilting bracket 160 at ordinary times to restrict the rotation and releases the connection with the tilting bracket 160 in the state in which the carrier part 200 is completely drawn out, such that the tilting bracket 160 rotates along with the carrier part 200.

That is, as illustrated in FIG. 8, the tilting bracket 160 is rotatably installed at the bumper back beam 10 to rotate by a predetermined angle downward from the rear portion of the fixing bracket 140 and thus the carrier part 200 performs the tilting operation.

Here, at the time of the tilting operation of the carrier part 200, a gas lifter A decelerating the rotation speed of the carrier part 200 may be applied.

Figure 9:
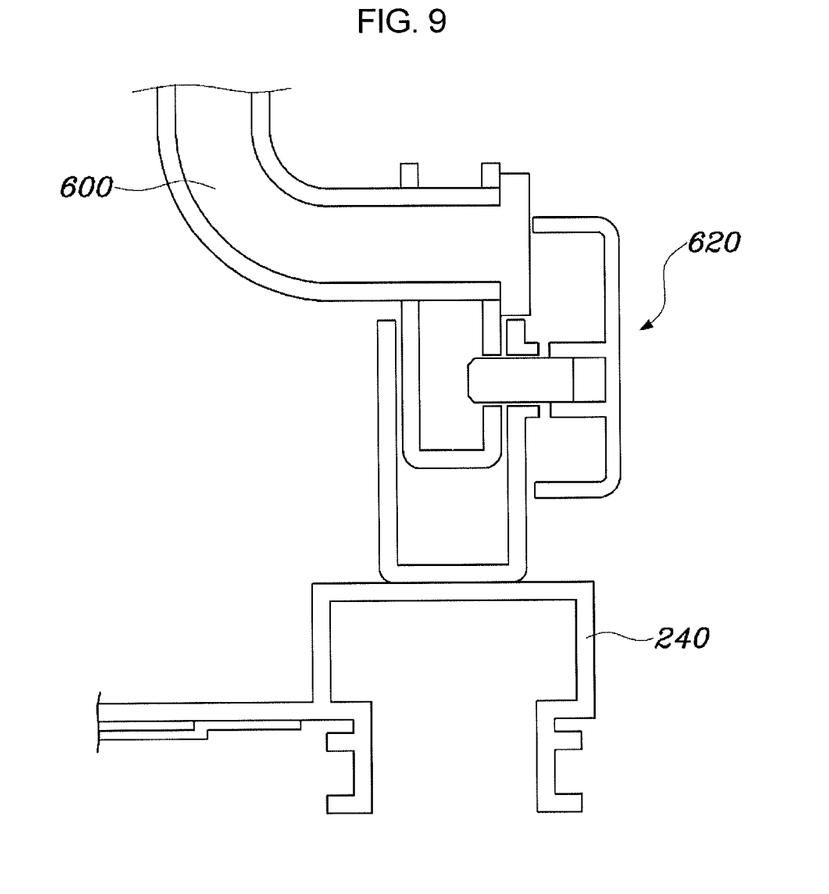

Meanwhile, as illustrated in FIG. 9, the side portions 240 of the carrier part 200 may be rotatably provided with a fixing bar 600 and may be provided with a fixing member 620 configured to fix the rotation position of the fixing bar 600.

The fixing bar 600 is a member for fixing the bicycle loaded at the carrier part 200 and a bicycle may be fixed to the fixing bar 600 by using a separate clamp mechanism. The fixing bar 600 is folded at an upper side of the side portion 240 of the carrier part 200 and rotates upward when the bicycle needs to be loaded and then is fixed to a body of the bicycle loaded at the carrier part 200 to more firmly fix the loaded bicycle.

When the fixing bar 600 is installed at the side portion 240 of the carrier part 200, a separate solenoid is used or various position fixing members are used to fix the rotating state. For example, as the fixing member 620 fixing the rotation position of the fixing bar 600, various members such as a locking lever, a latch apparatus, and a solenoid may be applied and the fixing bar 600 may be configured to automatically rotate by using the motor.

Describing the operation of the bicycle carrier apparatus for a vehicle according to the exemplary embodiment of the present invention as described above, the carrier part 200 is received in the bumper back beam 10 at ordinary times so as not to be exposed to the outside. When the bicycle needs to be loaded in this state, the control unit B controls and operates the first driving part 300 by manipulating a separate switch. Here, the switch may be installed at the tail gate or a driver's seat. In this case, the rear sensing sensor determines whether objects are present within a predetermined distance and if it is determined that the objects are not present, the drawing out operation of the carrier part 200 is performed.

By doing so, when the first driving part 300 is operated by the control of the control unit B, the first motor part 320 is driven till reaching the first reference time and as the moving link part 340 rotates by the rotation power transferred from the first motor part and the pinion gear 345 rotates, the carrier part 200 moves in the front and rear direction over the rack gear 105 of the guide rail 100. Here, the first solenoid part 120 interlocks with the first driving part 300 to separate from the carrier part 200 and permit the front and rear movement of the carrier part 200.

By doing so, when the first motor part of the first driving part reaches the first reference time, the carrier part 200 is completely drawn out from the bumper back beam 10 and the second driving part 500 is operated to perform the expansion deployment operation of the expansion support part 400.

That is, the second motor part 520 is driven till reaching the second reference time, and thus the rotation part 540 rotates and the rotation operation of the expansion link part 460 is performed by the rotation connection part 465 connected to the rotation part 540. Therefore, the moving member 442 of the loading part 440 connected to the expansion link part 460 moves along the extending direction of the expansion rail 420 and the moving member 442 moves to expandably deploy laterally the support member 444 to which the wheel of the bicycle is supported.

Meanwhile, when the carrier part 200 is completely drawn out from the bumper back beam 10, it is determined whether the carrier part 200 is tilted. That is, when the second solenoid part 180 provided at the fixed bracket 140 is operated and is separated from the tilting bracket 160, the rotation of the tilting bracket 160 is permitted and as the tilting bracket 160 rotates, the carrier part 200 rotates along with the tilting bracket 160 to perform the tilting operation.

The receiving operation of the carrier part of the operation of the bicycle carrier for a vehicle is a reverse order of the drawing out and expansion deployment operation. By this, the expansion support part 400 performs a contraction operation, and then the carrier part 200 is again received in the bumper back beam 10.

According to the carrier apparatus for a vehicle having the above-mentioned structure, it is possible to maintain the appearance design and improve the convenience, by installing the bicycle carrier at the bumper back beam 10 of the rear portion of the vehicle to prevent the bicycle carrier from being exposed to the outside at ordinary times and automatically drawing out the bicycle carrier from the bumper back beam 10 at the time of the loading of the bicycle to enable the loading of the bicycle.

Further, it is possible to more facilitate a use of a rear loading space by drawing out the bicycle carrier and then tilting the bicycle carrier and improve marketability by expandably deploying the bicycle loading part for loading the bicycle in both side directions.

In addition, it is possible to prevent the errors from occurring at the time of the operation of the bicycle carrier by performing the control to sequentially operate the drawing out and expansion operation of the bicycle carrier.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A bicycle carrier system for a vehicle, comprising:
   guide rails disposed at a lower portion of a bumper back beam while being symmetrical to each other in front and rear directions of the vehicle;
   a carrier part provided with a panel part and provided with side portions extending from both sides of the panel part to the guide rails to move along the guide rails to be drawn out and received;
   a first driving part installed at a front end portion of the carrier part and connected to the guide rails to move the carrier part in the front and rear directions along the guide rails;
   an expansion support part installed between the side portions of the carrier part to be expandably deployed laterally with respect to the vehicle and support a loaded bicycle;
   a second driving part installed at the carrier part to be connected to the expansion support part and expandably deploy the expansion support part laterally with respect to the vehicle; and
   a control unit controlling an operation of the first driving part and the second driving part and sequentially controlling the first driving part and the second driving part to draw out the carrier part and then performing an expansion deployment operation of the expansion support part,
   wherein the control unit stores a first reference time required to move the carrier part to a maximally drawn out position by operating the first driving part and when an operating time of the first driving part is equal to or more than the first reference time, operates the second driving part.

2. The bicycle carrier system for the vehicle of claim 1, wherein the bumper back beam is provided with a rear sensing sensor which senses objects within a predetermined distance from a rear and the control unit stops operations of the first driving part and the second driving part when object sensing information is received through the rear sensing sensor.

3. The bicycle carrier system for the vehicle of claim 2, wherein the control unit transfers a warning message to a driver when the object sensing information is received through the rear sensing sensor.

4. The bicycle carrier system for the vehicle of claim 1, wherein the control unit stores a second reference time required to deploy the expansion support part to a maximally expanded position by operating the second driving part and when an operating time of the second driving part is equal to or more than the second reference time, stops the operation of the second driving part.

5. The bicycle carrier system for the vehicle of claim 1, wherein the control unit stores a first reference setting value for an operating load of the first driving part and when the operating load of the first driving part is larger than the first reference setting value at a time of a drawing out operation of the carrier part, stops the operation of the first driving part.

6. The bicycle carrier system for the vehicle of claim 1, wherein the control unit stores a second reference setting value for an operating load of the second driving part and when the operating load of the second driving part is larger than the second reference setting value at a time of an expansion deployment of the expansion support part, stops the operation of the second driving part.

7. The bicycle carrier system for the vehicle of claim 1, wherein the first driving part includes:
   a first motor part transferring rotation power at a time of a signal input of the control unit; and a moving link part extending from the first motor part toward the side portions, making extending ends be connected to the guide rails, and making the carrier part slidably move in the front and rear directions along the guide rails when the first motor part is operated.

8. The bicycle carrier system for the vehicle of claim 6, wherein the extending ends of the moving link part are provided with pinion gears and the guide rails are provided with rack gears extending in the front and rear directions to be meshed with the pinion gears.

9. The bicycle carrier system for the vehicle of claim 1, wherein the expansion support part includes:
   an expansion rail extending to cross the side portions of the carrier part to be fixed to the side portions;
   a loading part slidably moving along the expansion rail; and
   an expansion link part extending in parallel with the expansion rail, being connected to the loading part to be move along a direction in which the loading part extends, and being connected to the second driving part to move the loading part along the expansion rail at a time of the operation of the second driving part.

10. The bicycle carrier system for the vehicle of claim 9, wherein the loading part includes:
   a moving member connected to the expansion link part to move along the direction in which the expansion link part extends at a time of the operation of the second driving part; and
   a support member extending laterally from the moving member to support a wheel of the bicycle.

11. The bicycle carrier system for the vehicle of claim 10, wherein the expansion link part is configured as a lead screw and is screw-connected to one side end of the moving member by penetrating through the moving member.

12. The bicycle carrier system for the vehicle of claim 10, wherein the expansion rail is provided with a guide groove along an extending direction and the support member is provided with a sliding part inserted into the guide groove to slidably move along the guide groove.

13. The bicycle carrier system for the vehicle of claim 9, wherein the second driving part includes:
   a second motor part transferring rotation power at a time of a signal input of the control unit; and
   a rotation part extending laterally from the second motor part to be connected to the expansion link part and rotating in the front and rear directions at a time of an operation of the second motor part to transfer the rotation power to the expansion link part.

14. The bicycle carrier system for the vehicle of claim 13, wherein the expansion link part is provided with a rotation connection part connected to the rotation part to receive the rotation power of the second motor part.

15. The bicycle carrier system for the vehicle of claim 14, wherein the rotation part of the second driving part and the rotation connection part of the expansion link part are provided with a gear mutually meshed with an outer circumferential surface.

16. The bicycle carrier system for the vehicle of claim 1, wherein the guide rails are provided with first solenoid parts selectively connected to the side portions of the carrier part to selectively permit a sliding movement of the carrier part.

17. The bicycle carrier system for the vehicle of claim 1, wherein the guide rail is provided with a fixing bracket fixedly installed to a rear end portion thereof and a tilting bracket positioned at a rear portion of the fixing bracket to be rotatably installed at the bumper back beam.

18. The bicycle carrier system for the vehicle of claim 17, wherein the fixing bracket is provided with a second solenoid part selectively connected to the tilting bracket to selectively permit a rotation operation of the tilting bracket.

19. The bicycle carrier system for the vehicle of claim 1, wherein the side portion of the carrier part is rotatably provided with a fixing bar and is provided with a fixing member configured to fix a rotation position of the fixing bar.

* * * * *